US006192301B1

(12) United States Patent
Park

(10) Patent No.: US 6,192,301 B1
(45) Date of Patent: Feb. 20, 2001

(54) SELF-DIAGNOSTIC METHOD FOR A FORKLIFT TRUCK

(75) Inventor: Jae Sun Park, Incheon (KR)

(73) Assignee: Daewoo Heavy Industries Ltd., Incheon (KR)

( * ) Notice: Under 35 U.S.C. 154(b), the term of this patent shall be extended for 0 days.

(21) Appl. No.: 09/123,438

(22) Filed: Jul. 28, 1998

(30) Foreign Application Priority Data

Jul. 28, 1997 (KR) ........................................ 97-35479

(51) Int. Cl.[7] .............................. G06F 7/00; G06F 19/00

(52) U.S. Cl. .............................. 701/29; 701/1; 701/50; 701/36; 187/222; 414/266; 414/275; 414/347

(58) Field of Search .............................. 701/29, 36, 1, 701/50; 187/222; 414/347, 266, 275

(56) References Cited

U.S. PATENT DOCUMENTS 4,517,645 * 5/1985 Yuki et al. ............................ 701/50

* cited by examiner

*Primary Examiner*—William A. Cuchlinski, Jr.
*Assistant Examiner*—Olga Hernandez
(74) *Attorney, Agent, or Firm*—Staas & Halsey LLP

(57) ABSTRACT

A self-diagnostic method is provided capable of testing condition of various components for a forklift truck selectively, displaying the result test codes collectively on a display after completing the test, and initiating a quick test mode during a run mode by simply manipulating an accelerator pedal and a direction lever of the forklift truck. The method comprises the steps of: providing a mode selector with a diagnostic mode and a run mode, a fuse, a key switch, an accelerator, a direction switch having forward and reverse positions, a tilt switch, contactor coils and a controller; initiating a main routine by the controller; reading a signal from the mode selector to decide which mode is selected from the diagnostic mode and the run mode; identifying that the fuse is removed and that the key switch is turned on when the diagnostic mode is selected; checking condition of the switches and the accelerator selectively according to an inputted diagnostic command in the order of priority to produce error codes in case of failure detection; saving the error codes occurred; and displaying the error codes collectively when the tilt switch is turned on.

4 Claims, 3 Drawing Sheets

SELF-DIAGNOSTIC METHOD FOR A FORKLIFT TRUCK

FIELD OF THE INVENTION

The present invention relates generally to a self-diagnostic method for a forklift truck, and more particularly to a method for diagnosing or testing condition of various components for a forklift truck selectively, identifying the resultant test codes collectively on a display after completing the test, and initiating a quick test mode by simply manipulating an accelerator pedal and a direction lever of the forklift truck during a run mode.

BACKGROUND OF THE INVENTION

Forklift trucks have been used either to lift goods of relatively heavy weight up to an elevated location or to lower the goods on the ground. The forklift trucks also can be used to move the goods from one place to another within a limited working area. Depending on the power sources employed, the forklift trucks are classified into an engine-driven forklift truck which may usually operate in an outdoor area and an electromotive forklift truck which are suitable for indoor operation, thanks to its reduced or little emission of exhaust gas and noise.

It is well known in the art that the electromotive forklift truck includes an electric travel motor whose speed and direction is controlled by a controller in response to external command signals. In addition to the electric travel motor, the electromotive forklift truck is provided with a variety of electric components that have the possibility of failure during their use. Since the failure of the electric components will make the forklift truck inoperable, it would be desirable to provide means for diagnosing and displaying the condition of the electric components in an efficient fashion so that the operator or repairman can take appropriate measure.

Background concerning a conventional method for diagnosing the forklift truck can be found in U.S. Pat. No. 4,521,885 by Melocik et al. The Melocik et al patent teaches a method for diagnosing the forklift truck in sequential order when the mode selector is in a diagnostic position. The diagnosing steps are predetermined by a software program.

However, the conventional diagnostic method has a disadvantage that it takes too long time to carry out the diagnosis, since the diagnosing procedure is automatically executed up to a final check point according to a programed schedule in sequential order even though the operator wants to give up halfway the diagnosis.

Additionally, the conventional diagnostic method poses a problem that the operator should repeatedly ascertain the resultant test code on the display during the period of test as the test code is temporarily displayed on the display each time a single sort of test is completed. Another problem of the conventional diagnostic method is that the operator can not initiate the test mode quickly during the run mode, since test switches need to be actuated in order to perform the in-service test.

SUMMARY OF THE INVENTION

The present invention is directed to overcoming one or more of the problems as set forth above.

It is an object of the invention to provide a self-diagnostic method that enables the operator to selectively check and diagnose condition of electric components for a forklift truck within a shortened period of test time.

It is another object of the invention to provide a self-diagnostic method that enables the operator to verify, at one time, all of the result ant test codes displayed on the display after finishing the test.

A further object of the invention is to provide a self-diagnostic method that enables the operator to initiate the test mode quickly during a run mode by simply manipulating an accelerator pedal and a direction lever.

In order to accomplish the above objects, the present invention provides a self-diagnostic method for a forklift truck, comprising the steps of: providing a mode selector with a diagnostic mode and a run mode, a fuse, a key switch, an accelerator, a direction switch having forward and reverse positions, a tilt switch, contactor coils, and a controller; initiating a main routine by the controller; reading a signal from the mode selector to decide which mode is selected from that the diagnostic mode and the run mode; identifying that the fuse is removed and the key switch is turned on when the diagnostic mode is selected; checking condition of the switches and the accelerator selectively according to an inputted diagnostic command in the order of priority to produce error codes in case of failure detection; saving the error codes occurred; and displaying the error codes when the tilt switch is turned on.

In accordance with the present invention, it is preferred that the self-diagnostic method for a forklift truck further comprises the steps of: reading a signal from the mode selector to verify whether the mode is changed; checking condition of the contactor coils according to an inputted diagnostic command in a sequential order to produce error codes in case of failure detection; and displaying the error codes occurred.

In accordance with the present invention, it is preferred that the self-diagnostic method for a forklift truck still further comprises the steps of: identifying that the key switch is turned on when the run mode is selected; checking condition of the switches and the accelerator selectively according to an inputted diagnostic command in the order of priority to produce error codes, in case of failure detection; and displaying the error codes occurred.

In accordance with the present invention, it is preferred that the self-diagnostic method for a forklift truck even further comprises the steps of: identifying that the accelerator pedal is manipulated during the run mode; verifying that the direction switch is in the reverse position when the accelerator pedal is manipulated; changing the run mode into a quick test mode when the direction switch is in the reverse position; and maintaining the run mode when the direction switch is in the forward position.

Additional features and advantages of the invention will be set forth in the description which follows, and in part will be apparent from the description, or may be learned by practice of the invention. The objectives and other advantages of the invention will be realized and attained by the structure as illustrated in the written description and claims hereof, as well as the appended drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention, in which.

DETAILED DESCRIPTION OF THE PREFERRED EMBODIMENT

Figure 1:
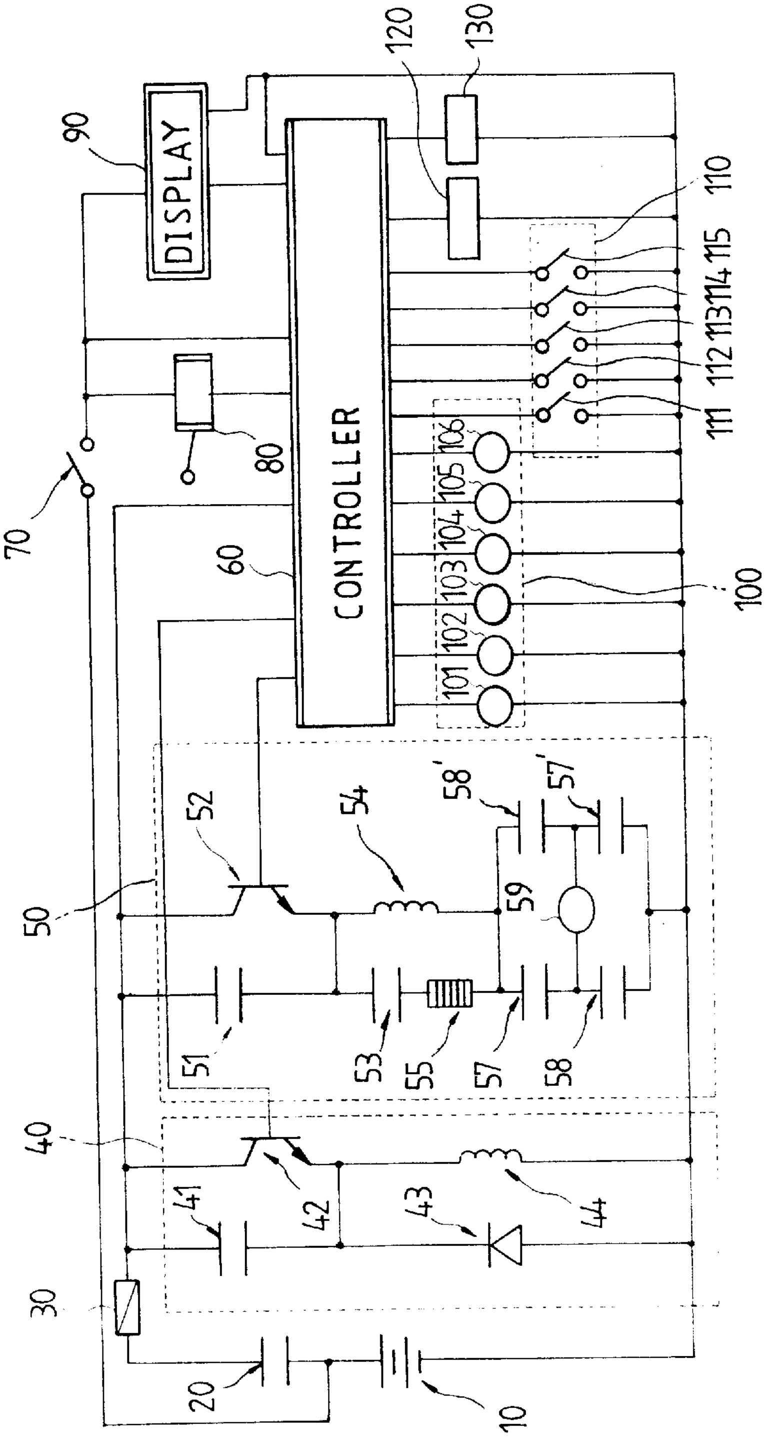
FIG. 1 is a schematic diagram showing an example of a driving controller for a forklift truck.

An example of a driving controller for a forklift truck is shown in FIG. 1. As shown, the driving controller for the forklift truck includes, a battery 10 for supplying electric power, a line contactor 20 connected to the battery 10, a fuse 30 connected to the line contactor 20, a pump motor driver 40 to drive an electric pump motor for producing pressurized working fluid, a travel motor driver 50 to drive an electric travel motor for having the forklift truck run forwards, a controller 60 for controlling operation of the forklift truck, an accelerator 80 for producing a speed command signal, a display 90 for displaying condition of the forklift truck in the form of codes, a key switch 70 for supplying electric power to the controller 60, the display 90 and the accelerator 80, a contactor coil group 100 having various coils for receiving command signals from the controller 60 in response to a desired operation mode of the driving controller, an input switch group 110 having various switches for controlling the pump motor driver 40, a direction switch 120 for controlling the travel motor driver 50, and a mode selector 130 having "diagnostic" and "run" modes.

The pump motor driver 40 includes a bypass contactor 41, a transistor 42, a pump motor 44 for driving a hydraulic pump, and a freewheel diode 43 for making smooth the negative electromotive forces developed at the pump motor 44 in the event of shut-down of the transistor 42.

Th travel motor driver 50 includes a bypass contactor 51, a transistor 52, a field/shunt contactor 53, a travel motor comprising a field 54 and an armature 59, a fuse 55 for protecting the armature 59 from over-currents, forward contactors 57 and 57' for causing the armature 59 to turn forwardly, and reverse contactors 58 and 58' for having the armature 59 turn reversely.

The contactor coil group 100 includes various contactor coils such as a line contactor coil 101, bypass contactor coils 102 and 103, a field/shunt contactor coil 104, a forward contactor coil 105, and a reverse contactor coil 106, which are adapted to open and close the associated contactors respectivley. The input switch group 110 includes various switches such as a tilt switch 111, lift switches 112 and 113, and auxiliary switches 114 and 115 for supplying command signals to the controller 60.

In the meantime, the line contactor coil 101 remains in operative association with and serves to control the line contactor 20 in response to control signals from the controller 60, which supplies the signal to energize the coil 101 and close the contactor 20. The line contactor 20 supplies or blocks electric power from the battery 10 to the pump motor driver 40, the travel motor driver 50, and the controller 60 in the event that the line contactor 20 is opened or closed. Regardless of the status of the line contactor 20, however, electric power continues to be supplied to the controller 60, the display 90, and the accelerator 80 via the key switch 70.

As soon as the controller 60 receives command signals from the input switch group 100, it issues motor control signals to the transistor 42. Based on the control signals from the controller 60, the transistor 42 acts to open and close the current path from the line contactor 20 to the pump motor 44, with the result that the pump motor 44 is turned on and off.

Just when a maximum speed command signal is received from the input switch group 110, the controller 60 feeds the signal to energize the bypass contactor coil 103 which in turn controls the associated contactor 41 in a manner similar to that set out in connection with the line contactor coil 101 and the contactor 20. The controller 60 supplies the signal to energize the bypass contactor coil 103 and close the contactor 41 at the time the command signal is received from auxiliary switches 114 and 115. Closing the contactor 41 establishes a current path through the pump motor 44 but not the transistor 42 so that the motor speed can be maximized.

In case where the controller 60 receives command signals from the accelerator 80, it feeds motor control signals to the transistor 52, in response to which the transistor 52 will open and close the current path from the line contactor 20 to the field 54. The control signals fed to the transistor 52 are of pulse trains having a variable duty factor. The duty factor, which means the percentage of "on-time" with respect to "off-time", varies according to the digital number supplied to the controller 60 by the accelerator 80.

Moreover, the forward and reverse contactor coils 105 and the associated contactors 57, 57', 58, and 58' are adapted to operate through the use of the direction control signals generated in the controller 60. In the event that the direction switch 120 is in the forward position, the controller 60 issues the signals to energize the forward contactor coil 105 and at the same moment close the associated contactors 57 and 57'. On the contrary, the controller 60 de-energizes the reverse contactor coil 106 and opens the associated contactors 58 and 58'. In case of the direction switch 120 being shifted to the reverse position, the controller 60 issues the signals to energize the coil 106 and close the associated contactors 58 and 58' but to de-energize the coil 105 and open the associated contactors 57 and 57'. If the direction switch 120 remains in a neutral position, the controller 60 issues the signals to de-energize both of the coils 105 and 106 and have the contactors 57, 57', 58, 58' opened. In a nutshell, the direction switch 120 with forward, reverse, and neutral positions, is designed to feed direction command signals to the controller 60 depending on the position thereof.

While the direction switch 120 is kept in the neutral position, the armature 59 is disabled due to the contactors 57, 57', 58, 58' being opened. If however, the switch 120 is in the forward position with the line contactor 20 closed, a current path is established from the battery 10, via the contactor 20, the fuse 30, the transistor 52, the field 54, the contactor 57, the armature 59, and the contactor 57' to the ground. The travel motor consisting of the field 54 and the armature 59 is rotated to drive the truck in the forward direction at a speed corresponding to the duty factor of the pulse trains fed to the transistor 52. Reverse operation proceeds in the same manner as that noted just above in relation to the forward operation except that the contactors 57 and 57' are opened and the contactors 58 and 58' are closed to thereby reverse the flow of current through the armature 59.

Upon receiving signals from the controller 60, the display 90 displays a variety of alpha-numeric characters which represent the predetermined diagnostic codes. The operation of the display 90 depends on the position of the mode selector 130. The mode selector 130 is adapted to issue mode selection command signals to the controller 60, which corresponds to diagnostic and run positions of the former.

In the forklift truck, the operating personnel needs to have information concerning the condition of the forklift truck, both prior to and during operation. The forklift truck employs numerous input and output devices which must be maintained in good order for the proper operation of the truck, including switches, sensors, contactors and coils as described above. The failure of one or more of these devices can render the forklift truck inoperative or reduce its efficiency. When the failure occurred is sensed, the controller 60 cuts off the power supply from the battery 10 and gets the error code displayed on the display 90 such that the operating personnel can recognize the error occurred and cope with the failure situation.

Figure 2:
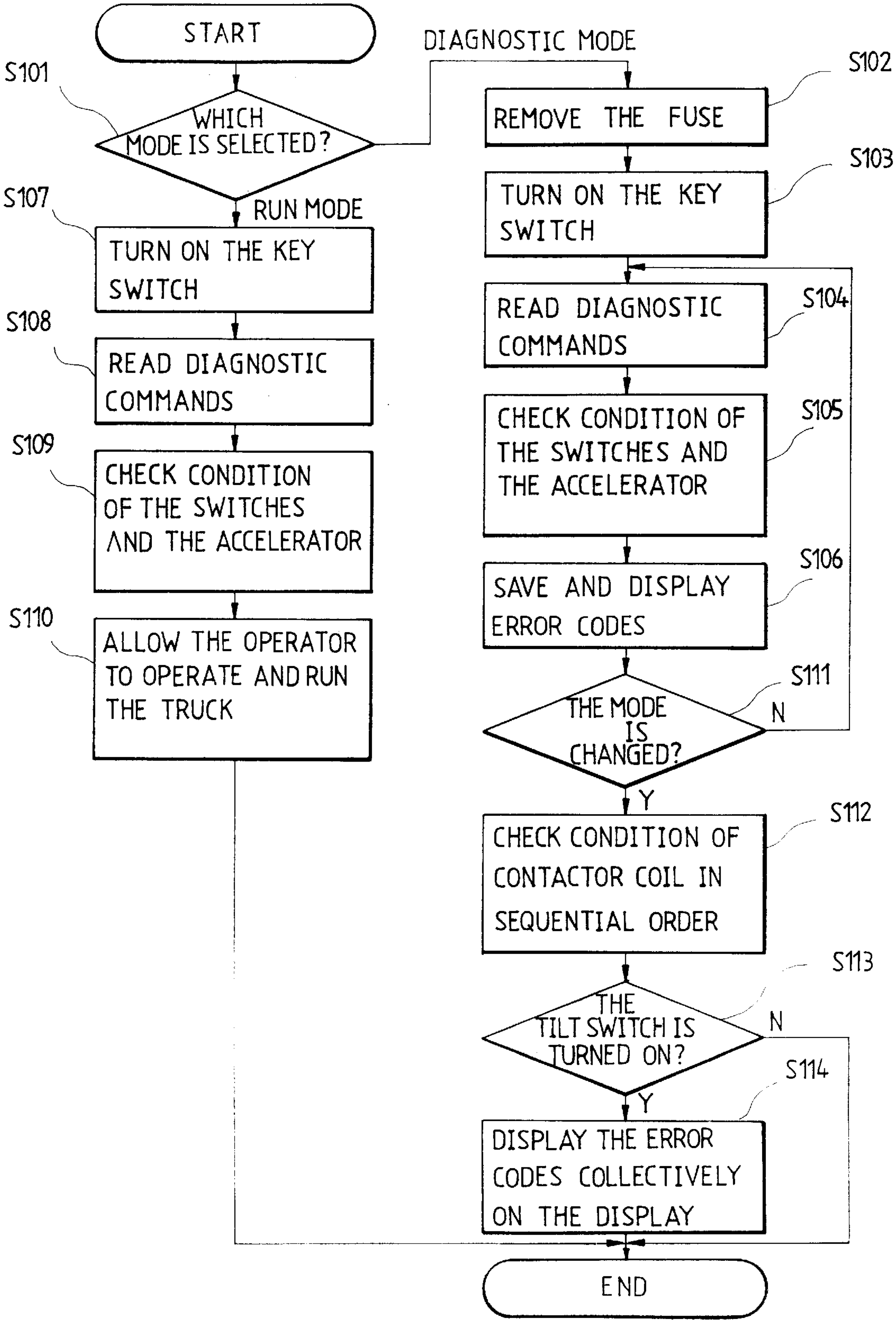
FIG. 2 is a flowchart demonstrating a main routine of a self-diagnostic method for a forklift truck in accordance with the present invention.

Referring now to FIG. 2, there is demonstrated a flowchart of a mail routine of a self-diagnostic method for a forklift truck in accordance with the present invention. The test mode is divided into a diagnostic mode and a run mode as shown in FIG. 2. The diagnostic mode performs checking and diagnosing an erroneous state of electric components for the forklift truck selectively. During the run mode, the operator can operate and run the forklift truck, and initiate the quick test mode using the accelerator pedal and the direction switch of the forklift truck. The quick test mode performs checking and diagnosing the switches simply in a short time.

First, after initiating the main routine by the controller 60, at step S101, the controller 60 reads a signal from the mode selector 130 to decide which mode is selected by the operator from the diagnostic mode and the run mode. When the diagnostic mode is selected, at steps S102 and S103, the controller 60 identifies that the fuse 30 is removed and the key switch 70 is turned on by the operator. And then, at step S104, the controller 60 reads diagnostic commands from the switches inputted by the operator. According to the diagnostic commands, at step S105, the controller 60 checks condition of the switches and the accelerator 80 in the order of priority to produce error codes in case of failure detection. The order of priority means the inputted order of the diagnostic commands by the operator. At step S106, the controller 60 saves the error codes to a built-in memory and displays the error codes on the display 90. The operator can ascertain the condition of the switches and the accelerator 80 by way of referring to the error codes on the display 90 and try to repair the erroneous portion. The display 90 is installed on a dashboard.

At step S111, the controller 60 reads a signal from the mode selector 130 to verify whether the mode is changed. When the mode has been changed, at step S112, the controller 60 checks automatically condition of the contactor coils such as a line contactor coil 101, bypass contactor coils 102 and 103, a field/shunt contactor coil 104, a forward contactor coil 105, and a reverse contactor coil 106 and condition of the associated contactors according to a diagnostic command inputted by the operator in sequential order.

At step S113, the controller 60 reads a signal from the tilt switch 111 to verify whether the tilt switch 111 is turned on. When the tilt switch 111 is turned on, at step S114, the controller 60 displays the error codes occurred collectively on the display 90.

When the run mode is selected, at step S107, the controller 60 identifies that the key switch 70 is turned on by the operator. And then, at step S108, the controller 60 reads diagnostic commands from the switches inputted by the operator. According to the diagnostic commands, at step S109, the controller 60 checks condition of the switches and the accelerator 80 in the order of priority to produce error codes in case of failure detection. At step S110, the controller 60 saves the error codes and displays the error codes on the display 90. Thereafter, at step S110, the controller 60 allows the operator to operate and run the forklift truck.

Figure 3:
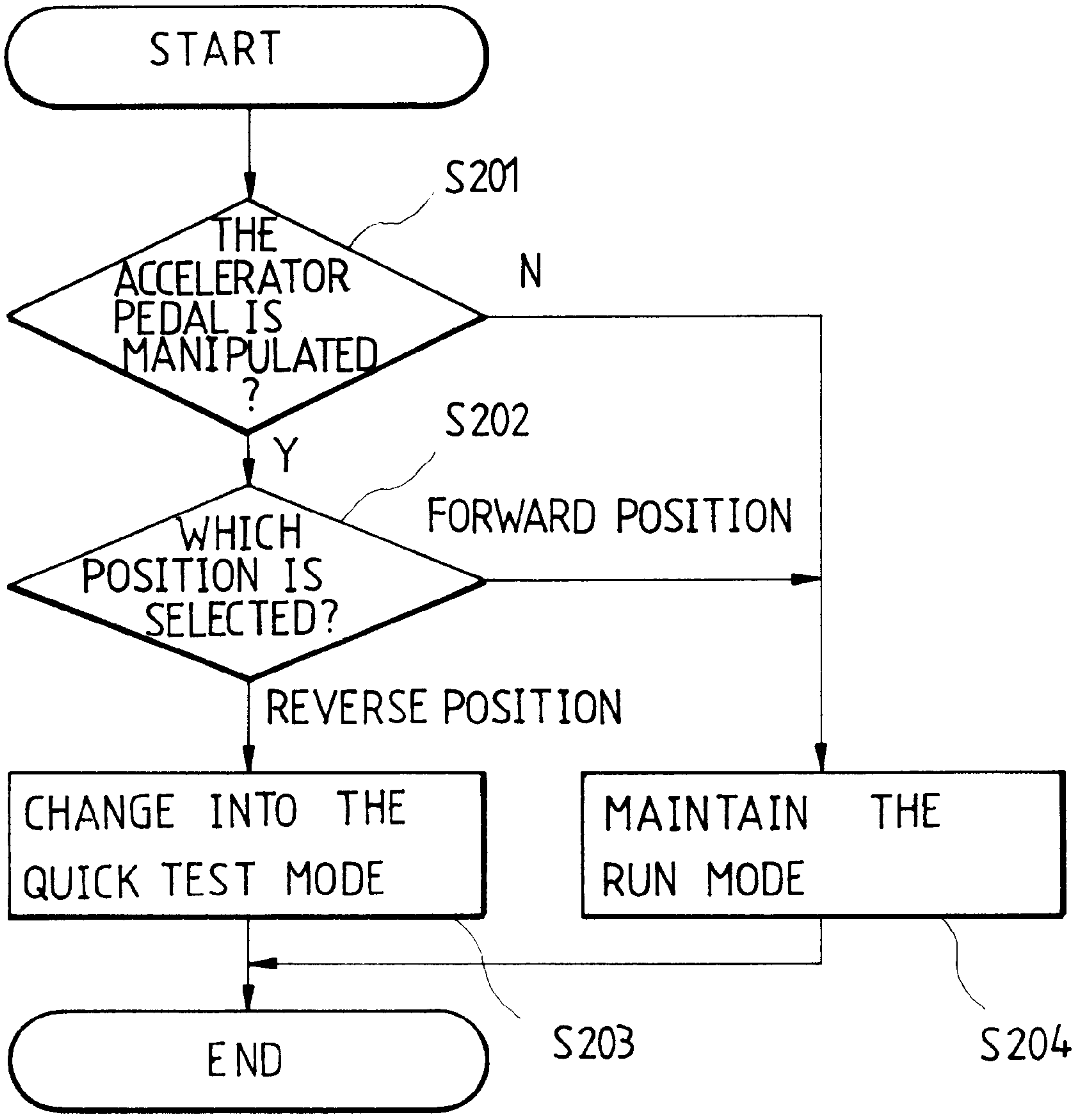
FIG. 3 is a flowchart demonstrating a subroutine of a self-diagnostic method for a forklift truck in accordance with the present invention.

During the run mode, if the accelerator pedal is manipulated by the operator when the controller 60 tests the switches and the accelerator 80, the controller 60 is interrupted to call and perform a subroutine at step S201 as shown in FIG. 3.

If the subroutine is called, at step S202, the controller 60 verifies that the direction switch 120 is in the reverse position. And then, at step S203, the controller 60 begins to perform a quick test mode when the direction switch 120 is in the reverse position. Consequently, the operator can initiate the quick test mode by using the accelerator pedal and the direction switch 120 simply during the in-service period of the forklift truck. In the quick test; mode, the controller 60 does not check the contactor coils and the associated contactors, because the fuse 30 is not removed. At step S204, if the direction switch 120 is in the forward position, the controller 60 maintains the run mode and returns to the main routine.

It will be apparent to those skilled in the art that various modifications and variations can be made in the self-diagnostic method of the present invention. Thus, it is intended that the present invention cover the modifications and variations of this invention provided they come within the scope of the appended claims and their equivalents.

What is claimed is:

1. A self-diagnostic method for a forklift truck comprising the steps of:

providing a mode selector with a diagnostic mode and a run mode, a fuse, a key switch, an accelerator, a direction switch having forward and reverse positions, a tilt switch, contactor coils, and a controller;

reading a signal from the mode selector to decide which mode is selected from the diagnostic mode and the run mode;

identifying that the fuse is removed and that the key switch is turned on when the diagnostic mode is selected;

checking condition of the switches and the accelerator selectively according to an inputted diagnostic command to produce error codes in case of failure detection;

saving the error codes occurred; and displaying the error codes collectively when the tilt switch is turned on.

2. A self-diagnostic method for a forklift truck as set forth in claim 1, further comprising the steps of:

reading the signal from the mode selector to verify whether the mode is changed;

checking condition of the contactor coils according to an inputted diagnostic command in sequential order to produce error codes in case of failure detection; and displaying the error codes occurred.

3. A self-diagnostic method for a forklift truck as set forth in claim 2, further comprising the steps of:

identifying that the key switch is turned on when the run mode is selected;

checking condition of the switches and the accelerator selectively according to an inputted diagnostic command to produce error codes in case of failure detection; and displaying the error codes occurred.

4. A self-diagnostic method for a forklift truck as set forth in claim 3, further comprising the steps of:

identifying that the accelerator pedal is manipulated during the run mode;

verifying that the direction switch is in the forward position when the accelerator pedal is manipulated;

changing the run mode into a quick test mode when the direction switch is in the reverse position; and maintaining the run mode when the direction switch is in the forward position.

* * * * *